United States Patent
Kingston et al.

(10) Patent No.: US 7,448,477 B2
(45) Date of Patent: Nov. 11, 2008

(54) DEVICE FOR DISPLACING AN OBJECT A CERTAIN DISTANCE

(75) Inventors: Timothy Kingston, Eskilstuna (SE);
Jonny Strandberg, Eskilstuna (SE);
Mats Åkerblom, Eskilstuna (SE)

(73) Assignee: Volvo Construction Equipment Holding AB, Ekilstuna (SE)

( * ) Notice: Subject to any disclaimer, the term of this patent is extended or adjusted under 35 U.S.C. 154(b) by 609 days.

(21) Appl. No.: 10/711,578

(22) Filed: Sep. 26, 2004

(65) Prior Publication Data
US 2007/0227836 A1    Oct. 4, 2007

Related U.S. Application Data

(63) Continuation of application No. PCT/SE03/00498, filed on Mar. 25, 2003.

(30) Foreign Application Priority Data
Mar. 26, 2002    (SE) ................................... 0200966

(51) Int. Cl.
*F16D 55/40*    (2006.01)
*F16D 65/54*    (2006.01)
(52) U.S. Cl. ............... 188/71.8; 188/196 R; 192/111 A
(58) Field of Classification Search ................. 188/71.8, 188/196 R; 192/111 A
See application file for complete search history.

(56) References Cited

U.S. PATENT DOCUMENTS 3,542,165 A * 11/1970 Lucien ..................... 188/196 P
3,762,522 A    10/1973 Kirschling
3,957,146 A     5/1976 Le Blanc
3,990,547 A * 11/1976 Plaat ....................... 188/196 R
4,010,828 A     3/1977 Ditlinger (Continued)

FOREIGN PATENT DOCUMENTS

DE    10012358 A1    9/2001

(Continued)

OTHER PUBLICATIONS

International Search Report dated Jun. 24, 2003 from International Application PCT/SE03/00498.

(Continued)

*Primary Examiner*—Robert A Siconolfi
*Assistant Examiner*—Mahbubur Rashid
(74) *Attorney, Agent, or Firm*—Novak Druce + Quigg, LLP

(57) ABSTRACT

A device for displacing an object a certain distance is disclosed. In one particular context, the device may be used in a brake piston. The device features a driving member and an interconnecting member located between the driving member and the object being driven (e.g., the brake piston). The driving member and the interconnecting member form a friction joint between them. The friction joint is strong enough that the driving member can push the object back to a retracted position when it is no longer being actuated, but weak enough that the interconnecting member, and hence the object, can be pushed forward relative to the driving member when the driving member reaches a maximum forward position. This lets the object (e.g., the piston) automatically adjust its non-actuated position so the same amount of fluid is required to move the piston forward as associated brake pads get thinner.

18 Claims, 3 Drawing Sheets

U.S. PATENT DOCUMENTS

| | | | |
|---|---|---|---|
| 4,640,400 A | 2/1987 | Nakane et al. |
| 4,993,532 A | 2/1991 | Weiss et al. |
| 6,016,892 A | 1/2000 | Berwanger |
| 6,131,705 A | 10/2000 | Dahlen et al. |

FOREIGN PATENT DOCUMENTS

| | | | |
|---|---|---|---|
| EP | 0105977 A1 | 4/1984 |
| GB | 2099939 A | 12/1982 |
| WO | 03/081073 A1 | 10/2003 |

OTHER PUBLICATIONS

International Search Report dated Jun. 23, 2006 from International Application PCT/SE03/00498.

* cited by examiner

DEVICE FOR DISPLACING AN OBJECT A CERTAIN DISTANCE

CROSS-REFERENCE TO RELATED APPLICATIONS

The present application is a continuation patent application of International Application No. PCT/SE03/00498 filed 25 Mar. 2003 which was published in English pursuant to Article 21(2) of the Patent Cooperation Treaty, and which claims priority to Swedish Application No. 0200966-0 filed 26 Mar. 2002. Said applications are expressly incorporated herein by reference in their entireties.

FIELD OF THE INVENTION

The present invention relates to a device for displacing an object a certain distance, and in which the object is displaceable between a forward position and a rearward position. In this regarding, and more specifically, the device comprises (includes, but is not necessarily limited to) a driving unit that is displaceable between a first position and a second position for driving the object a distance corresponding to the distance between the first and the second position. This is accomplished by means of a friction joint that, when the driving unit is displaced from the first position to the second position, is designed to enable displacement of the driving unit and the object relative to each another under the influence of a certain lowest force. Further, the inventive arrangement includes a member that is arranged to act on the driving unit in a direction towards the second position by means of a spring force.

In one embodiment, the invention relates to an arrangement to brake a vehicle in which the vehicle comprises a device configured according to the invention, and the use of which is for automatic adjustment of a brake piston and a brake disc cooperating with the brake piston at a certain distance relative to each other.

It is contemplated, however, that the invention may be used for displacing different objects in many technical applications and environments. By way of example but not limitation, the invention is described herein relative to the field of application in which the device constitutes a means for automatic adjustment of play between a brake piston and a cooperating brake disc. In this field of application, when the brake piston is displaced from the brake disc after a brake operation has been accomplished, it is desirable that the piston be displaced a distance of equal length each time, independent of the wear of the brake lining occurring on the brake disc. The reason why this repeatability is desired is that in this manner one and the same distance between the piston and the brake disc is obtained for every brake operation, and in turn, one and the same quantity of hydraulic oil will be required for displacing the piston in a braking action, independent of incurred wear on the brake lining.

BACKGROUND OF THE INVENTION

Such a device for adjustment of play (a take-up device) in a friction brake is described, for example, in U.S. Pat. No. 6,131,705. Although the device described therein works very well in many respects, under certain circumstances it has been shown to have drawbacks. When the device is under load, and in particular such a load which gives rise to radial fluctuations such as vibrations of the piston (i.e., fluctuations in a direction which is substantially perpendicular to the displacement direction of the piston), it has been shown that the included friction joint between the piston and a spring loaded sleeve arranged in the piston (which friction joint has the task of transferring the requisite displacement force from a spring to the brake piston when the brake piston is returned, and which friction joint in the braking operation has to ensure that the piston may be displaced relative to the sleeve, if needed, to reach the brake disc) does not work well, and which means that displacements of the piston cannot be accomplished as intended.

SUMMARY OF THE INVENTION

In one embodiment, an object of the invention is to provide a device in which the above-described problems associated with the friction joint have been reduced to a great extent; that is, a device which is able to provide the desired displacement of the object, such as a brake piston, to a greater extent even when the object is under load so that fluctuations of the object arise in a direction which is substantially perpendicular to the intended displacement direction of the object. Exemplarily, this object is achieved by a device which comprises a component for interconnecting the driving unit and the object, and in which device the interconnecting component has a surface which is designed to form the friction joint in cooperation with a surface of the driving unit. The interconnecting component and the object are interconnected so that the interconnecting component and the object are locked against displacement relative to each other when the object is acted upon in a direction towards the forward position and when the interconnecting component is acted upon in the opposite direction for driving the object to the rearward position (i.e., by means of the interconnecting component when the driving unit is displaced to the second position under the influence of the spring member, and for driving the driving unit to the first position by means of the interconnecting component when the object is displaced to the forward position).

By the use of an interconnecting component such that the object does not constitute a part in the friction joint, the device becomes less sensitive to motions, vibrations and deformations of the object which arise as a consequence of the object having been loaded in a direction which is substantially perpendicular to the intended displacement direction of the object. In addition, the object does not need to have such a high degree of dimensional accuracy, since it could be allowed, and in some cases it could be an advantage, that play occurs between the object and the interconnecting component in a direction which is substantially perpendicular to the intended displacement direction of the object.

According to one preferred embodiment of the invention, the interconnecting component and the object are arranged relative to each other so that a play having an extension in a direction which is substantially perpendicular to the displacement direction of the object between the forward and the rearward positions occurs between the interconnecting component and the object. By arranging such a play, it could be avoided to a greater extent that the object through the interconnecting component transfers an undesired force to the friction joint even if a delimiting surface of the object, by for example vibrations, is displaced in an undesired direction towards the interconnecting component and the friction joint.

According to another preferred embodiment of the invention, the interconnecting component is provided with a shoulder and the object is provided with a corresponding shoulder, and these shoulders are arranged to cooperate for the interconnection of the interconnecting component and the object. Because of the shoulders which lock the interconnecting component and the object against displacement relative to each other in the current mutual displacement direction when lying in abutment with each other, an easy and reliable construction for interconnecting the interconnecting component and the object is obtained so that when the driving unit is displaced (and thereby the interconnecting component), the interconnecting component pushes the object in a direction towards the rearward position and when the object is displaced, the object pushes the interconnecting component, and thereby the driving unit, in a direction towards the first position. Furthermore, the possibility to arrange the interconnecting component and the object so that these overlap each other when seen in a direction which is substantially perpendicular to the intended displacement direction of the object is obtained. Such an overlap has in turn a potential to contribute to a construction which takes up less space.

Further advantages and advantageous features of the device according to the invention will become apparent from the following description, including the incorporated and associated drawings.

BRIEF DESCRIPTION OF THE DRAWINGS

A description in greater detail of exemplifying embodiments of the invention will follow below with reference to the attached drawings in which.

DETAILED DESCRIPTION OF PREFERRED EMBODIMENTS OF THE INVENTION

Figure 1:
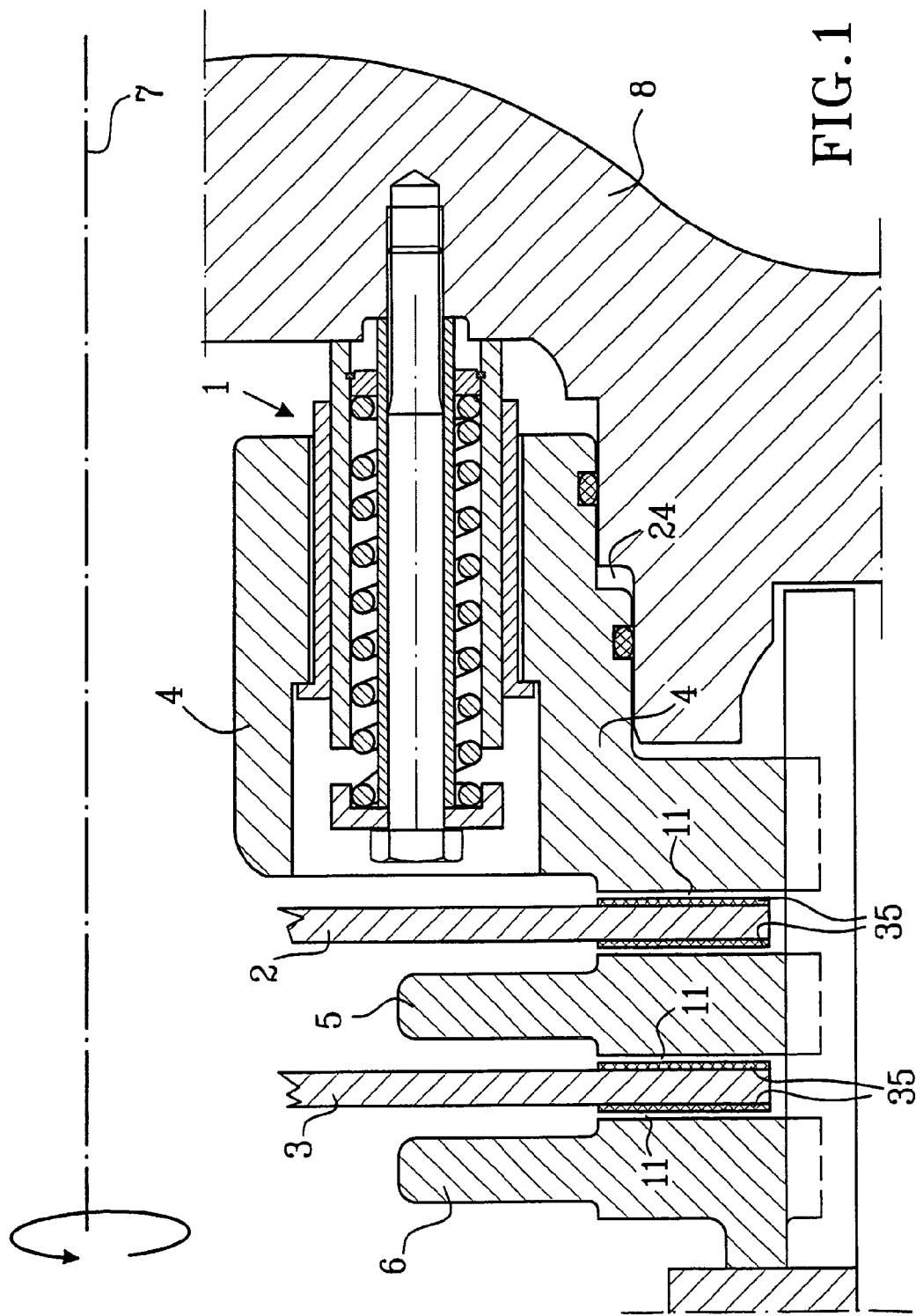
FIG. 1 is a cross-sectional view of a brake arrangement including a device configured according to the present invention.

In FIG. 1, a brake arrangement including a device 1 configured according to the invention is illustrated in a sectional view. The brake arrangement includes two brake discs 2, 3, one 2 of which is arranged to cooperate directly with a piston 4. The brake discs 2, 3 are provided with linings 35 to increase the friction between the discs on one hand, and the piston 4, a stator disc 5 and a counter disc 6 on the other hand. Furthermore, the brake discs 2, 3 are mounted on an axis 7, such as for example a wheel axle of a vehicle. The piston 4 is slidably journalled in a housing 8 for linear displacement between a forward position during braking and a rearward position when play (a spacing distance) 11 occurs between the piston 4 and the brake disc 2 located closest thereto.

Figure 2:
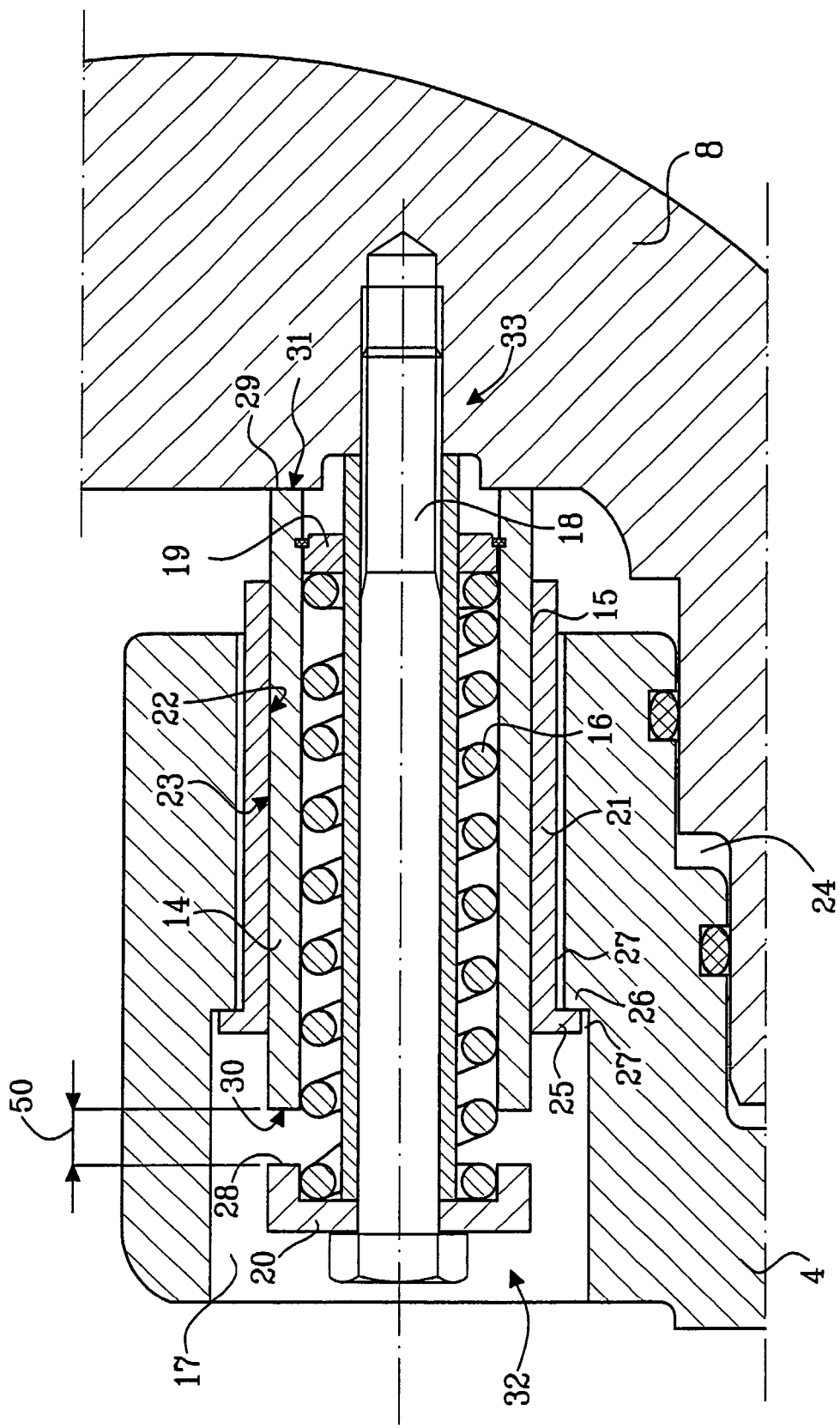
FIG. 2 is an enlarged cross-sectional view of the device of FIG. 1.
Figure 3:
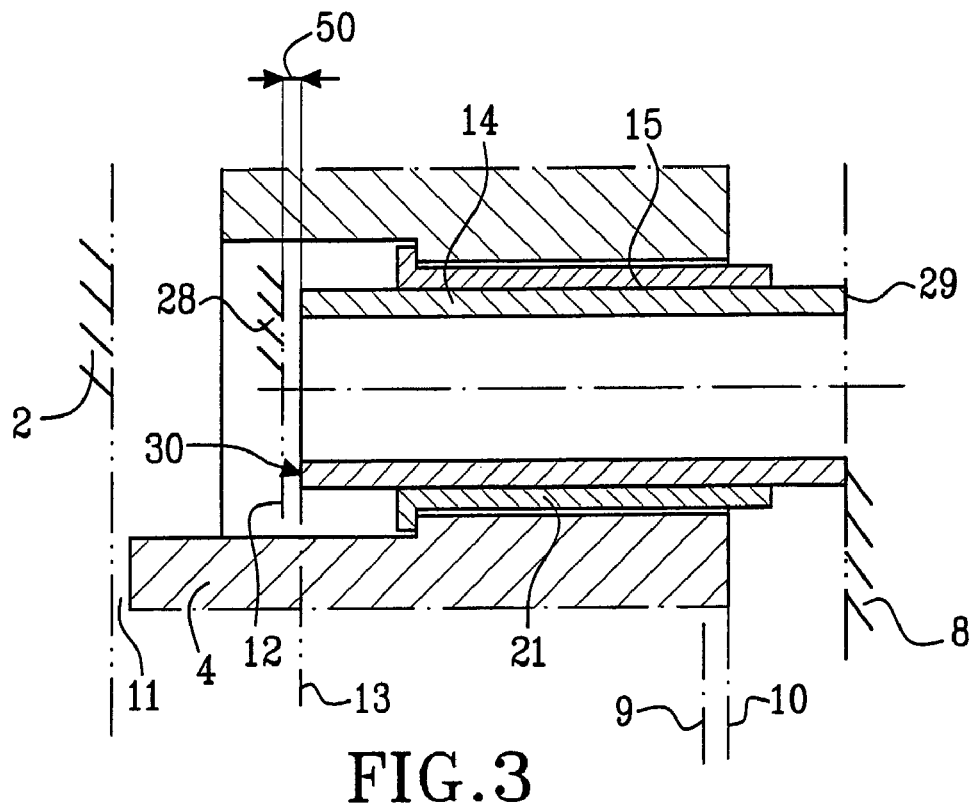
FIG. 3 is a schematic cross-sectional view illustrating an intended function of the device when incorporated in a brake arrangement, with the brake arrangement in a rest position.
Figure 4:
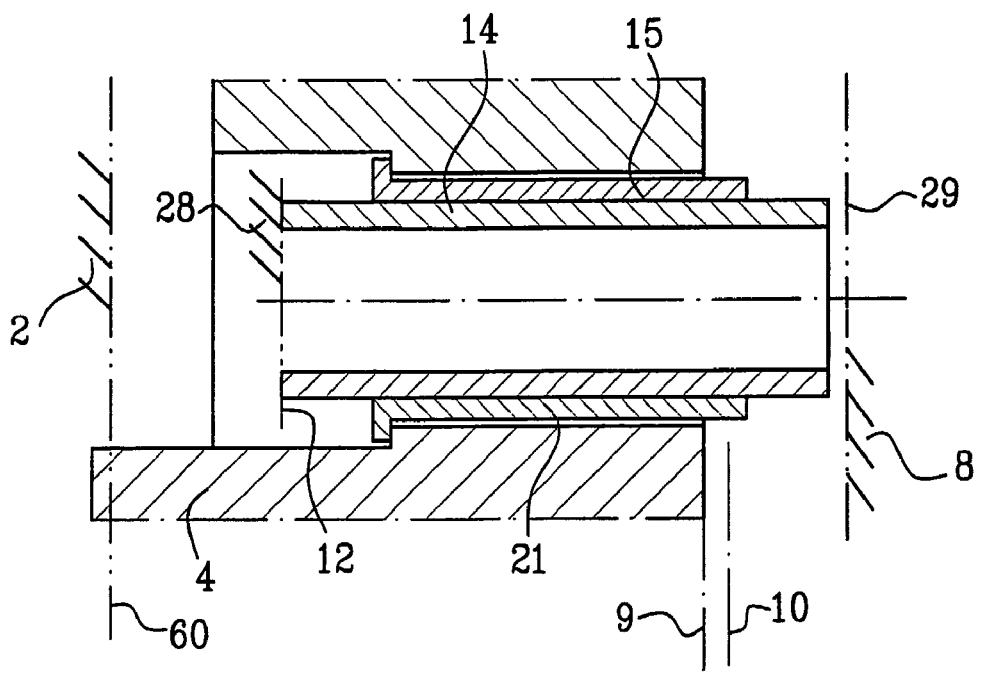
FIG. 4 is a schematic cross-sectional vie illustrating the intended function of the device of FIG. 3 when the brake arrangement is in a brake position.

FIG. 2 shows a device configured according to the invention in an enlarged view, and in FIGS. 3 and 4, it is exemplarily illustrated how the device operates. The device comprises a unit 14 displaceable between a first position 12 and a second position 13 for driving an object 4 that is displaceable between a forward position 9 and a rearward position 10. In this illustrated embodiment, the object is constituted by the piston 4 and the displacement distance corresponds to the space between the first 12 and the second 13 position caused to be traversed by means of a friction joint 15 when the driving unit is displaced from a first position to a second position. Furthermore, the device comprises a member 16 which is arranged to act on the driving unit 14 in a direction towards the second position 13 by means of a spring force.

Suitably, one or more devices according to the invention are arranged in bore holes 17 of the piston 4 and fastened in the housing 8 by means of, for example, a pin 18, bolt or similar member. The driving unit 14 is preferably a sleeve 14 displaceable along the pin 18 and having, for example, a circular cross-section arranged substantially concentrically around the pin 18. Externally of the pin 18 and internally of the sleeve 14, the spring member 16 (illustrated in the form of a helical spring) is arranged to act on the sleeve 14 in a direction towards the second position 13 (to the right in FIGS. 1-4). For enabling the spring 16 to transfer the force to the sleeve 14, the sleeve has, internally, a counter component 19 against which the spring 16 in one end thereof abuts and in the free end 32 of the pin 18 a corresponding counter component 20 is arranged against which the other end of the spring 16 abuts. Obviously, other types of springs may also be used for this function and within the term "spring member" any component which has the requisite spring action while creating the current spring force is included.

The illustrated device further comprises a component 21 for interconnecting the driving unit 14 and the piston 4. The interconnecting component 21 has a surface 22 which is designed to form the friction joint 15 in cooperation with a surface 23 of the driving unit 14 and the interconnecting component 21 and the piston 4 are interconnected so that the interconnecting component 21 and the piston 4 are locked against displacement relative to each other when the piston is acted on in a direction towards the forward position 9 and the interconnecting component 21 is acted on in the opposite direction, for driving the piston 4 to the rearward position 10 by means of the interconnecting component 21 when the driving unit 14 is displaced to the second position 13 under influence of the spring member 16 and for driving the driving unit 14 to the first position 12 by means of the interconnecting component 21 when the piston 4 is displaced to the forward position 9. The interconnecting component 21 is preferably a second sleeve having a cross-section corresponding to the first sleeve and which second sleeve is arranged concentrically and externally relative to the first sleeve.

Thus, the function of the friction joint 15 is to transfer the force from the spring 16 to the interconnecting component 21, and thereby to the piston 4, when the piston 4 is returned, i.e. after braking of the brake discs 2,3 has been accomplished, and to transfer the force from the interconnecting component 21 to the driving unit 14 when the piston is displaced in the opposite direction. At the same time as this friction joint 15 has to be designed in a way being capable of transferring the current forces, it must also allow the interconnecting component 21, and thereby the piston 4, and the driving unit 14 to be displaced relative to each other in the case that the piston 4 has to be displaced further after the driving unit 14 has reached the first position 12 so as to enable the piston 4 to reach the forward position 9, which may be the case when the lining of the brake disc has been worn in the preceding braking operation.

The displacement of the piston 4 to the forward position 9 is accomplished by hydraulic oil being supplied to a chamber 24 (see FIGS. 1 and 2) between the piston 4 and the housing 8 so that the piston is acted on by a force in the direction towards the brake disc 2. When decreasing the pressure of the hydraulic oil and draining the chamber 24, the piston 4 will return to the rearward position 10 by means of the spring force. Due to the fact that the driving unit 14 will drive the piston 4 a distance corresponding to the distance which occurs between the first position 12 and the second position 13 of the driving unit, the piston will always be displaced a distance of equal length from the brake disc 2, and from the forward position 9, to the rearward position 10 independent of how it is located relative to the driving unit 14 in the forward position 9. This is true despite any wear of the lining of the brake disc 2. This means that as the wear of the brake lining continues, the forward and the rearward positions of the piston 4 will be gradually changed; i.e., displaced in a direction towards the brake disc 2 (to the left in FIGS. 1-4).

Although the interconnecting component 21 in the illustrated embodiment is provided with a shoulder 25 and the piston 4 is provided with a corresponding shoulder 26, and these shoulders 25, 26 are arranged to cooperate for the interconnection of the interconnecting component 21 and the piston 4, other types of couplings are also contemplated. The main thing is that such an interconnection between the interconnecting component 21 and the piston 4 may be achieved so that displacement of the interconnecting component 21 and the piston 4 relative to each other is impeded when the piston 4 is acted on in a direction towards the brake disc 2 and the interconnecting component 21 is acted on in an opposite direction and that the displacement of the piston may be accomplished without the piston constituting part of the friction joint 15. In the simplest case, a surface of the interconnecting component could cooperate with a surface of the object so that the interconnecting component and the object are located after each other along the intended displacement direction of the object.

The use of a shoulder of the interconnecting component and/or the object often provides, however, a space-saving construction since the interconnecting component and the object may be arranged to overlap each other. Although the shoulders in the illustrated embodiment are designed as ring-shaped flanges of respective sleeves, when using the concept having a protruding portion of any kind, one or more discrete such portions may be used, and furthermore, these portions may have a number of different shapes. It should be emphasized that neither the driving unit nor the interconnecting component necessarily have to be a sleeve and even in the case when such a sleeve is used, the sleeve could also be, for example, slotted so that it displays several discrete portions.

In accordance with the invention, and if so desired, the piston 4 and the interconnecting component 21 can be designed and positioned so that the interconnecting component 21 and/or a play spacing 27, which is located between the piston 4 and the interconnecting component 21 in a direction which is substantially perpendicular to the surfaces 22, 23 included in the friction joint 15, may take up any deformations of the piston 4. The requisite friction joint 15 between the driving unit 14 and the interconnecting component 21 may thereby remain unaffected by certain smaller fluctuations of the piston 4 which eventually arise in the current direction as a consequence of the piston being loaded. By means of the use of play space 27, it is avoided that an undesired force be transferred from the object to the interconnecting component and further to the friction joint which could otherwise take place, for example, should vibrations occur in the object (which vibrations in turn mean that a limiting surface of the object moves in a direction alternatively towards and away from the interconnecting component). However, instead of the play space, or in combination therewith, it is possible to design the interconnecting component so that it is provided with at least one portion for taking up any occurring deformation of and/or force from the object to thereby avoid the contact surfaces of the friction joint from being loaded. For example, an outer layer of the interconnecting component, including the surface turned towards the object, could be relatively soft compared to the layer including the surface which constitutes part of the friction joint so as to minimize the effect of the object on the friction joint.

To obtain well defined end positions of the driving unit 14 corresponding to the first 12 and the second 13 positions, the device comprises a first stop 28 against which first stop 28 the driving unit 14 abuts when being in the first position 12 and when the object 4, here the piston, is in the forward position 9. Furthermore, the device comprises a second stop 29 against which second stop 29 the driving unit 14 abuts when being in the second position 13 and when the object 4 is in the rearward position 10. In the illustrated embodiment, the driving unit 14 is located substantially between the first stop 28 and the second stop 29 and the extension of the driving unit 14 between a surface 30 of the driving unit 14 which is intended to abut against the first stop 28 and a surface 31 of the driving unit 14 which is intended to abut against the second stop 29 is adapted to the distance between the first stop 28 and the second stop 29 so that, when the driving unit is in the second position 13 (such as illustrated in FIGS. 1-3), the distance 50 between the first stop 28 and the surface 30 of the driving unit 14 which is intended to abut against the first stop 28 corresponds to the distance that the object 4 is displaced from the forward position 9 when being displaced from the forward position 9 to the rearward position 10. In this manner, the distance that the piston 4 is displaced in the direction away from the brake disc 2 may be determined by adapting said extension of the driving unit 14. Thus, the distance 50 corresponds to the total play 11 which occurs between the different components; i.e., the counter disc, the stator disc, the brake discs and the piston in the illustrated embodiment, when the piston is in the rearward position 10. In the illustrated embodiment, the pin 18 in the free end 32 thereof is provided with the first stop 28 and in the second anchored end 33 thereof is provided with the second stop 29.

Although the driving unit 14, the interconnecting component 21 and the object 4 itself, in the illustrated embodiment, are designed for a substantially rectilinear displacement, it is also possible when implementing the invention to displace an object a certain distance by pivoting the object and in such connection use components which are pivotable relative to each other. In such a case, these components are suitably arranged to be pivotable about one and the same pivot axis.

With reference first to FIGS. 3 and 4, hereinafter follows a description of the functions of the device according to the invention when being used together with a brake arrangement. For the purpose of simplification in the example, it is assumed that the entire current play 11 in the brake corresponds to the distance between the brake disc 2 and the piston 4 when being in a rest position.

In FIG. 3, the piston 4 is schematically illustrated in the rearward position 10 thereof and the driving unit 14 in the second position 13 thereof where it abuts against the second stop 29 of the housing 8. Thus, in this rest position of the brake arrangement, no braking action takes place and there is a play 11 between the piston 4 and the brake disc 2. This play 11 is substantially as great as the distance 50 between the first stop 28 for the driving unit 14 and the surface 30 of the driving unit 14. From the rest position, braking is accomplished by hydraulic oil being supplied to the chamber 24 (see FIG. 1 or 2) whereby the piston 4 is displaced towards the forward position 9; i.e., towards the brake disc 2 (to the left in the FIGS. 1-4). Through the interconnection with the piston 4, the interconnecting component 21 will in the same way be displaced in the same direction as the piston 4 when the piston is displaced.

Because of the friction joint 15 between the interconnecting component 21 and the driving unit 14, the driving unit 14 will also be displaced. During displacement of the driving unit 14, the spring 16 (not illustrated in FIGS. 3 and 4) will be compressed between both the counter components 19, 20 arranged for the spring 16. When the driving unit 14 reaches the first position 12 and thereby abuts against the first stop 28, the driving unit 14 may, however, not be further displaced in the current direction. This means that by a certain lowest force determined by the design of the friction joint 15, the piston 4 and the interconnecting component 21 will be displaced further as long as this displacement is not impeded by the brake disc 2, while the driving unit 14 remains in the first position 12 and the interconnecting component 21 and the driving unit 14 slide relative to each other. This further displacement of the piston 4 is required to bring the piston into contact with the brake disc and to obtain the requisite brake action in the case the lining of the brake disc 2 has become worn.

In this state, such as illustrated in FIG. 4, the braking of the brake disc 2 is accomplished. In FIG. 4, it is also schematically illustrated how the piston 4 has passed beyond the brake position 60 of the preceding braking operation to some extent.

After accomplishing the brake operation, when lowering the hydraulic pressure and draining the chamber 24, the driving unit 14 will be returned to the second position 13, corresponding to the original state illustrated in FIG. 3, by means of the spring force of the spring 16. When displacing the driving unit 14, this will drive the interconnecting component 21 and also the piston 4, since the piston 4 is interconnected with the interconnecting component 21, by means of the friction joint 15, a distance corresponding to the above mentioned distance 50.

The device is then in position to again perform a brake operation for which substantially the same amount of hydraulic oil is needed as was the case for the preceding brake operation independent of any wear of the lining of the brake disc 2.

It will be obvious that the invention is not restricted to the exemplified embodiments of the invention described herein, but only by the patent claims. Even though the invention has been described in the application of a brake arrangement, it is obvious to a man skilled in the art that the invention may be applied within a number of other fields of use as well. For example the invention may advantageously be applied in a clutch arrangement. Once the idea of the invention has been introduced, further modifications within the scope of the invention should be obvious for a man skilled in the art.

What is claimed is:

1. A device for displacement of an object (4) a certain distance which object is displaceable between a forward position (9) and a rearward position (10), said device comprising:
    a driving unit (14) displaceable between a first position (12) and a second position (13) for driving an object (4) a distance corresponding to a distance between the first and the second positions (12, 13) by means of a friction joint (15) when the driving unit (14) is displaced from the first position to the second position (12, 13), said friction joint being configured to enable displacement of the driving unit (14) and the object (4) relative to each another under the influence of a certain lowest force;
    a spring member (16) arranged to act on the driving unit (14) in a direction towards the second position (13) by means of a spring force; and
    an interconnecting component (21) that interconnects the driving unit (14) and the object (4), the interconnecting component (21) having a surface (22) that forms the friction joint (15) in cooperation with a surface (23) of the driving unit, and the interconnecting component (21) and the object (4) being interconnected so that the interconnecting component (21) and the object (4) are locked against displacement relative to one another when the object (4) is acted on in a direction towards the forward position (9) and the interconnecting component (21) is acted on in an opposite direction, for driving the object (4) to the rearward position (10) by means of the interconnecting component (21) when the driving unit (14) is displaced to the second position (13) during influence of the spring member (16) and for driving the driving unit (14) to the first position (12) by means of the interconnecting component (21) when the object (4) is displaced to the forward position (9);
    wherein the interconnecting component (21) and the object (4) are arranged relative to each other so that a play space (27) having an extension in a direction which is substantially perpendicular to the displacement direction of the object between the forward and the rearward positions is formed between the interconnecting component (21) and the object (4), the play space being sufficient to prevent undesired force from being transferred from the object (4) to the interconnecting component (21) and to the friction joint (15).

2. The device as recited in claim 1, wherein at least one of the interconnecting component (21) and the object (4) is provided with a shoulder (25, 26) for the interconnection of the interconnecting component (21) and the object (4).

3. The device as recited in claim 2, wherein the interconnecting component (21) is provided with said shoulder (25) and the object (4) is provided with a corresponding shoulder (26), and the shoulders (25, 26) are arranged to cooperate for interconnecting the interconnecting component (21) and the object (4).

4. The device as recited in claim 1, wherein the interconnecting component (21) is provided with at least one portion for taking up any occurring deformation of and/or force from the object to thereby avoid loading the contact surfaces (22, 23) of the friction joint (15).

5. The device as recited in claim 1, further comprising:
    a first stop (28) against which first stop the driving unit (14) abuts when being in the first position (12) and the object (4) is in the forward position (9).

6. The device as recited in claim 5, wherein the driving unit (14) is located substantially between the first stop (28) and the second stop (29), the extension of the driving unit between a surface (30) of the driving unit which is configured to abut against the first stop and a surface (31) of the driving unit which is intended to abut against the second stop is adapted to the distance between the first stop and the second stop so that, when the driving unit is in the second position (13), the distance between the first stop (28) and the surface (30) of the driving unit (14) which is configured to abut against the first stop (28) corresponds to the distance that the object (4) is displaced from the forward position (9) when the object is displaced from the forward position (9) to the rearward position (10).

7. The device as recited in claim 1, further comprising:
    a second stop (29), against which second stop the driving unit (14) abuts when being in the second position (13) and the object (4) is in the rearward position (10).

8. The device as recited in claim 1, wherein the driving unit (14) is a first sleeve.

9. The device as recited in claim 8, further comprising:
    a pin (18) around which said first sleeve (14) is arranged substantially concentrically and along which the sleeve is displaceable.

10. The device as recited in claim 9, wherein the pin (18) in a first free end (32) thereof is provided with said first stop (28).

11. The device as recited in claim 9, wherein the pin (18) in an anchored second end (33) thereof is provided with said second stop (29).

12. The device as recited in claim 9, wherein the pin (18) is attached to a component (8) in which the object (4) is slidably journalled.

13. The device as recited in claim 1, wherein the interconnecting component (21) is a second sleeve.

14. The device as recited in claim 13, wherein said second sleeve (21) is arranged concentrically and externally relative to the first sleeve (14).

15. The device as recited in claim 1, wherein said device is configured to cooperate with an object (4) constituted by a piston arranged to cooperate with one or more brake discs (2, 3) for braking thereof when being in the forward position (9).

16. An arrangement for braking a vehicle, said arrangement including a device comprising:
   a driving unit (14) displaceable between a first position (12) and a second position (13) for driving an object (4) a distance corresponding to a distance between the first and the second positions (12, 13) by means of a friction joint (15) when the driving unit (14) is displaced from the first position to the second position (12, 13), said friction joint being configured to enable displacement of the driving unit (14) and the object (4) relative to each another under the influence of a certain lowest force;
   a spring member (16) arranged to act on the driving unit (14) in a direction towards the second position (13) by means of a spring force; and
   an interconnecting component (21) that interconnects the driving unit (14) and the object (4), the interconnecting component (21) having a surface (22) that forms the friction joint (15) in cooperation with a surface (23) of the driving unit, and the interconnecting component (21) and the object (4) being interconnected so that the interconnecting component (21) and the object (4) are locked against displacement relative to one another when the object (4) is acted on in a direction towards the forward position (9) and the interconnecting component (21) is acted on in an opposite direction, for driving the object (4) to the rearward position (10) by means of the interconnecting component (21) when the driving unit (14) is displaced to the second position (13) during influence of the spring member (16) and for driving the driving unit (14) to the first position (12) by means of the interconnecting component (21) when the object (4) is displaced to the forward position (9);
   wherein the interconnecting component (21) and the object (4) are arranged relative to each other so that a play space (27) having an extension in a direction which is substantially perpendicular to the displacement direction of the object between the forward and the rearward positions is formed between the interconnecting component (21) and the object (4), the play space being sufficient to prevent undesired force from being transferred from the object (4) to the interconnecting component (21) and to the friction joint (15).

17. A vehicle having a braking arrangement, said braking arrangement including a device comprising:
   a driving unit (14) displaceable between a first position (12) and a second position (13) for driving an object (4) a distance corresponding to a distance between the first and the second positions (12, 13) by means of a friction joint (15) when the driving unit (14) is displaced from the first position to the second position (12, 13), said friction joint being configured to enable displacement of the driving unit (14) and the object (4) relative to each another under the influence of a certain lowest force;
   a spring member (16) arranged to act on the driving unit (14) in a direction towards the second position (13) by means of a spring force; and
   an interconnecting component (21) that interconnects the driving unit (14) and the object (4), the interconnecting component (21) having a surface (22) that forms the friction joint (15) in cooperation with a surface (23) of the driving unit, and the interconnecting component (21) and the object (4) being interconnected so that the interconnecting component (21) and the object (4) are locked against displacement relative to one another when the object (4) is acted on in a direction towards the forward position (9) and the interconnecting component (21) is acted on in an opposite direction, for driving the object (4) to the rearward position (10) by means of the interconnecting component (21) when the driving unit (14) is displaced to the second position (13) during influence of the spring member (16) and for driving the driving unit (14) to the first position (12) by means of the interconnecting component (21) when the object (4) is displaced to the forward position (9);
   wherein the interconnecting component (21) and the object (4) are arranged relative to each other so that a play space (27) having an extension in a direction which is substantially perpendicular to the displacement direction of the object between the forward and the rearward positions is formed between the interconnecting component (21) and the object (4), the play space being sufficient to prevent undesired force from being transferred from the object (4) to the interconnecting component (21) and to the friction joint (15).

18. A method for providing a braking arrangement in a vehicle, said method comprising:
   utilizing a device to provide automatic adjustment of a brake piston (4) and a brake disc (2) cooperating with said brake piston at a certain distance (11) relative to one another, said device comprising:
      a driving unit (14) displaceable between a first position (12) and a second position (13) for driving an object (4) a distance corresponding to a distance between the first and the second positions (12, 13) by means of a friction joint (15) when the driving unit (14) is displaced from the first position to the second position (12, 13), said friction joint being configured to enable displacement of the driving unit (14) and the object (4) relative to each another under the influence of a certain lowest force;
      a spring member (16) arranged to act on the driving unit (14) in a direction towards the second position (13) by means of a spring force; and
      an interconnecting component (21) that interconnects the driving unit (14) and the object (4), the interconnecting component (21) having a surface (22) that forms the friction joint (15) in cooperation with a surface (23) of the driving unit, and the interconnecting component (21) and the object (4) being interconnected so that the interconnecting component (21) and the object (4) are locked against displacement relative to one another when the object (4) is acted on in a direction towards the forward position (9) and the interconnecting component (21) is acted on in an opposite direction, for driving the object (4) to the rearward position (10) by means of the interconnecting component (21) when the driving unit (14) is displaced to the second position (13) during influence of the spring member (16) and for driving the driving unit (14) to the first position (12) by means of the interconnecting component (21) when the object (4) is displaced to the forward position (9);

wherein the interconnecting component (21) and the object (4) are arranged relative to each other so that a play space (27) having an extension in a direction which is substantially perpendicular to the displacement direction of the object between the forward and the rearward positions is formed between the interconnecting component (21) and the object (4), the play space being sufficient to prevent undesired force from being transferred from the object (4) to the interconnecting component (21) and to the friction joint (15).

* * * * *

UNITED STATES PATENT AND TRADEMARK OFFICE
CERTIFICATE OF CORRECTION

PATENT NO. : 7,448,477 B2  Page 1 of 1
APPLICATION NO. : 10/711578
DATED : November 11, 2008
INVENTOR(S) : Timothy Kingston et al.

It is certified that error appears in the above-identified patent and that said Letters Patent is hereby corrected as shown below:

Title Page; At Page 1, line (73) should read as follows:

(73) Assignee: VOLVO CONSTRUCTION EQUIPMENT HOLDING SWEDEN AB, Ekilstuna (SE)

Signed and Sealed this

Twenty-first Day of September, 2010

David J. Kappos
*Director of the United States Patent and Trademark Office*